Aug. 23, 1966  C. J. BENNETT  3,268,255
WEEDING AND CULTIVATING IMPLEMENT
Filed Feb. 9, 1965
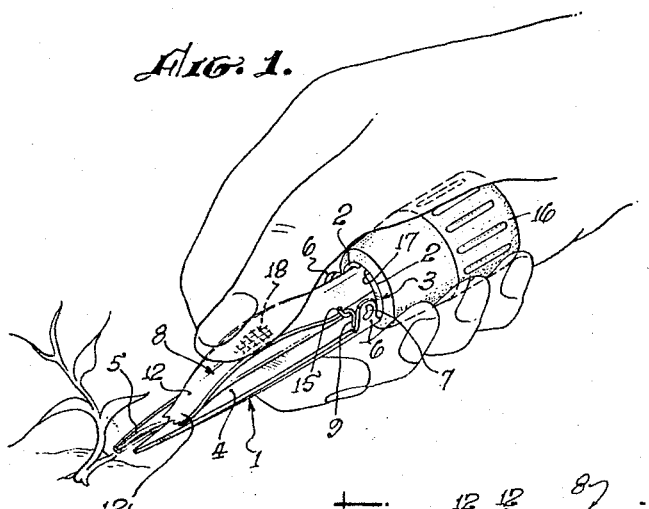
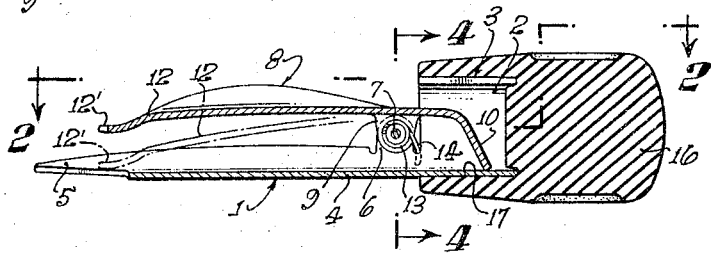
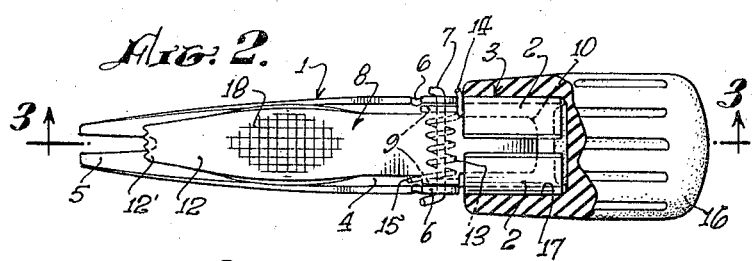
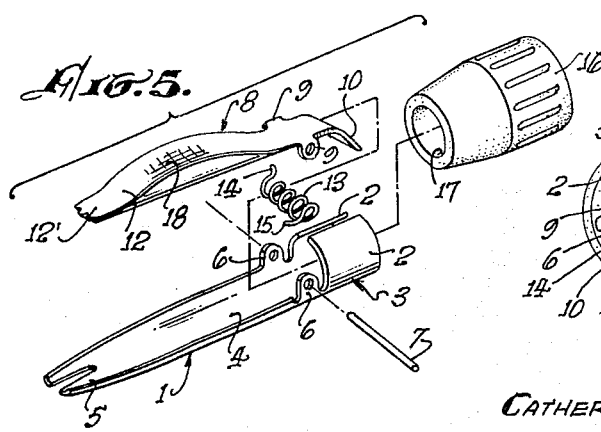
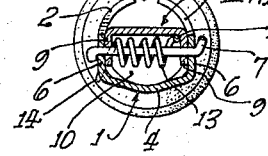
INVENTOR
CATHERINE J. BENNETT,
By Harold J. Le Visconte
ATTORNEY.

3,268,255
WEEDING AND CULTIVATING IMPLEMENT
Catherine J. Bennett, 1101 E. Orange Grove Ave., Burbank, Calif.
Filed Feb. 9, 1965, Ser. No. 431,381
5 Claims. (Cl. 294—50.9)

This invention relates to agricultural implements and more particularly an implement for weeding and cultivating.

In flower gardening and the like, women object to the idea of pulling weeds and like work with the bare hands since such work is not conducive to keeping the hands in the desired immaculate condition. Moreover, the use of gloves is objectionable since much of the work is impeded rather than helped.

With these considerations in mind, the present invention has for its principal object, the provision of a small weed digging and pulling device which is useful also in loosening the soil and which may be held in and operated by one hand both for usages of cultivating the soil and to loosen and pick up or pull up weeds.

Another object of the invention is to provide a weeding and cultivating implement in which the foregoing principal objective is realized in practice, which is simple in construction, economical to manufacture, and which is effective for its intended purposes.

With the foregoing objects in view, together with such additional objects and advantages as may subsequently appear, the invention resides in the parts, and in the construction, combination and arrangement of parts described, by way of example, in the following specification of a presently preferred embodiment of the invention, reference being had to the accompanying drawings which form a part of said specification and in which drawings:

FIG. 1 is a perspective view of a combined weeding and cultivating implement constituting a presently preferred embodiment of the invention shown as used to grasp and pull up a weed, FIG. 2 is an enlarged top plan view of the implement, having reference to FIG. 1, a portion of the handle being broken away to show interior details as on the staggered line 2—2 of FIG. 3, FIG. 3 is a medial longitudinal sectional view as on the line 3—3 of FIG. 2, FIG. 4 is a transverse sectional view taken on the line 4—4 of FIG. 3, and FIG. 5 is an exploded perspective view of the component parts of the illustrated embodiment of the device.

Referring to the drawings, the illustrated embodiment comprises a main or base component 1 formed from a sheet metal blank of modified T-shape and of which the arms 2, 2 constituting the head portion are bent toward each other in a circular configuration to form a substantially tubular head end 3 while the stem portion of the "T" constitutes a blade 4 which is bent into a longitudinally extending concavo-convex configuration with the concave side thereof extending in the same direction as the head portion or end 3 and terminating in a tapered bifurcated distal end 5. Adjacent to the head end 3, the side edges of the blade 4 extend beyond the remainder of said edges to form a pair of spaced parallel ear portions 6, 6.

The ear portions 6, 6 are perforated and support a transversely disposed hinge pin 7 mounted therein and secured against endwise movement by having the opposite ends thereof bent into substantial parallelism with the outer surfaces of the ear portions 6, 6. A clamp member 8, also formed of sheet metal is provided with parallel spaced ear portions 9, 9 which extend in close parallel proximity to the ear portions 6, 6 and through which the pivot pin 7 extends. The clamp member includes a stop member end portion 10 which extends into the enclosure formed by the head end 3 and is thence bent toward the juncture of the blade 4 with the head 3. The opposite end 12 of the clamp member constitutes a clamping blade which is of substantially the same width as the blade 4 and of slightly less length and which is of generally similar concavo-convex transverse configuration and which for the major portion of its length from the ears 9, 9 is spaced from the blade 4 and at its distal end 12' is bent toward the concave side of the blade 4 and is preferably serrated.

Between the ear portions 9, 9 of the clamp member, the pivot pin 7 is surrounded by a helical torsion spring 13 having one end 14 thereof engaging one of the ears 6 and the other end 15 thereof engaging the one of the ears 9 which is remote from the ear 6 engaged by the end 14, the initial bias of the spring being such as to tend to rock the clamp member clockwise about the pivot pin 7 as viewed in FIG. 3 with resultant movement of the distal end 12 thereof away from the blade 4 to the extent permitted by the engagement of the end 10 to the clamp member with the interior of the head end 3 of the base component 1 as shown in FIG. 3. The head portion or end 3 is preferably fitted with a heavy rubber cap constituting a handle 16 having a tubular socket 17 in which the tubular head end 3 is tightly received and the top surface of the clamp member 8 at about the midlength of the blade portion thereof is preferably knurled as indicated at 18 for engagement by the thumb of the user.

In use, the device is held in the hand as shown in FIG. 1 with the fingers surrounding the handle 16 which rests in the palm of the hand and with the thumb resting on the knurled surface of the clamp member. Thus held, the device may be used to loosen the soil and to loosen the roots of weeds or to dig them entirely free and the device can then be employed as a tweezer-like means to pick up the weeds and remove them from the soil. The concavo-convex configurations of the blade portions permit the use of light weight sheet metal while providing adequate strength and rigidity and in the case of the clamp member, this configuration affords a convenient socket for the thumb while the device is being used.

While in the foregoing specification there has been disclosed a presently preferred embodiment of the invention, the invention is not to be deemed to be limited to the precise details of construction thus disclosed by way of example, and it will be understood that the invention includes as well all such changes and combinations in the parts and in the construction, combination and arrangement of parts as shall come within the purview of the appended claims.

I claim:

1. A weeding and cultivating implement comprising an elongated blade component formed of thin metal and including a ground penetrating distal end portion of concavo-convex transverse configuration, an elongated clamp member disposed at and extending generally parallel to the concave side of said blade component, means pivotally interconnecting said blade component and said clamp member disposed at a point remote from the distal ends thereof and arranged to permit relative movement of said distal ends toward and away from each other, spring means reacting between said blade component and said clamp member constantly operating to move said distal ends apart, a handle means carried by said blade component at the end thereof opposite said distal end and adapted to so position said implement in the hand of a user that the thumb of that hand may engage said clamp member in opposition to the bias of said spring means for moving said clamp member into juxtaposition with said blade for clamping a weed or the like therebetween.

2. A weeding and cultivating implement as claimed in claim 1 in which said opposite end of said blade combines with said handle means to form a recess and in which said clamp member includes a portion thereof extending into said recess and is adapted to engage said blade component to limit the extent of said pivotal movement imparted by said spring means.

3. A weeding and cultivating implement as claimed in claim 1 in which said clamp member between said distal end and said pivotal mounting thereof is provided with a longitudinally extending concave outer surface affording convenient engagement for the thumb of a user.

4. A weeding and cultivating implement as claimed in claim 1 in which said pivotal mounting includes a pivot pin, and in which said pivot pin, additionally, serves as the mounting means for said spring means.

5. A weeding and cultivating implement as claimed in claim 1 in which said opposite end of said blade component is formed into a tubular configuration generated about an axial line generally parallel to said blade portion thereof and in which said handle means is formed with a cylindrical recess into which said tubular end of said blade component is tightly fitted.

References Cited by the Examiner

UNITED STATES PATENTS 1,097,827   5/1914   Tsuboi _____ 294—50.9

EVON C. BLUNK, *Primary Examiner.*

C. H. SPADERNA, *Assistant Examiner.*